United States Patent
Machii et al.

(10) Patent No.: US 12,497,073 B2
(45) Date of Patent: Dec. 16, 2025

(54) AUTONOMOUS TRAVELLING MINE VEHICLE

(71) Applicant: Hitachi Construction Machinery Co., Ltd., Tokyo (JP)

(72) Inventors: Kimiyoshi Machii, Tokyo (JP); Shinichi Uotsu, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 200 days.

(21) Appl. No.: 18/279,641

(22) PCT Filed: Mar. 23, 2022

(86) PCT No.: PCT/JP2022/013332
§ 371 (c)(1),
(2) Date: Sep. 1, 2023

(87) PCT Pub. No.: WO2023/042451
PCT Pub. Date: Mar. 23, 2023

(65) Prior Publication Data
US 2024/0140483 A1 May 2, 2024

(30) Foreign Application Priority Data
Sep. 15, 2021 (JP) .................. 2021-149923

(51) Int. Cl.
*B60W 60/00* (2020.01)

(52) U.S. Cl.
CPC ..... *B60W 60/0011* (2020.02); *B60W 2300/17* (2013.01)

(58) Field of Classification Search
None
See application file for complete search history.

(56) References Cited

U.S. PATENT DOCUMENTS

2018/0284787 A1 10/2018 Naka et al.
2018/0372841 A1 12/2018 Hieida et al.
(Continued)

FOREIGN PATENT DOCUMENTS

| EP | 4134285 A1 * | 2/2023 | ............ B60W 30/09 |
| JP | 2015125760 A * | 7/2015 | ......... G06K 9/00805 |

(Continued)

OTHER PUBLICATIONS

English translation of JP-2015125760-A (wherein the paragraph numbering provided coincides with any relevant citations to this reference within the accompanying Office Action) (Year: 2015).*

(Continued)

*Primary Examiner* — Jason Holloway
*Assistant Examiner* — Bryant Tang
(74) *Attorney, Agent, or Firm* — Crowell & Moring LLP

(57) ABSTRACT

An object of the invention of the application is to provide an autonomous travelling mine vehicle that can suppress a decrease in work efficiency when dust is generated at a work site. Therefore, the autonomous travelling mine vehicle includes a surrounding monitoring sensor that measures a three-dimensional point cloud of a terrain profile around the vehicle body, and a travelling route setting device calculates an undetected area representing a terrain profile part that the surrounding monitoring sensor cannot measure, calculates an alternative route on which the vehicle body can travel without passing through the undetected area on the basis of the positional relationship between the undetected area and the vehicle body, and updates the scheduled route with the alternative route.

6 Claims, 19 Drawing Sheets

(56) References Cited

U.S. PATENT DOCUMENTS

2019/0170518 A9* 6/2019 Sullivan .............. G06Q 10/083
2021/0064041 A1* 3/2021 Kim ................ B60W 30/18159

FOREIGN PATENT DOCUMENTS

| JP | 2016-24685 A | 2/2016 |
| JP | 2017-97482 A | 6/2017 |
| JP | 6385745 B2 | 9/2018 |
| WO | WO 2017/149813 A1 | 9/2017 |

OTHER PUBLICATIONS

International Search Report (PCT/ISA/210) issued in PCT Application No. PCT/JP2022/013332 dated Jun. 14, 2022 with English translation (4 pages).

Japanese-language Written Opinion (PCT/ISA/237) issued in PCT Application No. PCT/JP2022/013332 dated Jun. 14, 2022 with English translation (5 pages).

International Preliminary Report on Patentability (PCT/IB/338 & PCT/IB/373) issued in PCT Application No. PCT/JP2022/013332 dated Mar. 28, 2024, including English translation of Written Opinion (PCT/ISA/237) (5 pages).

* cited by examiner

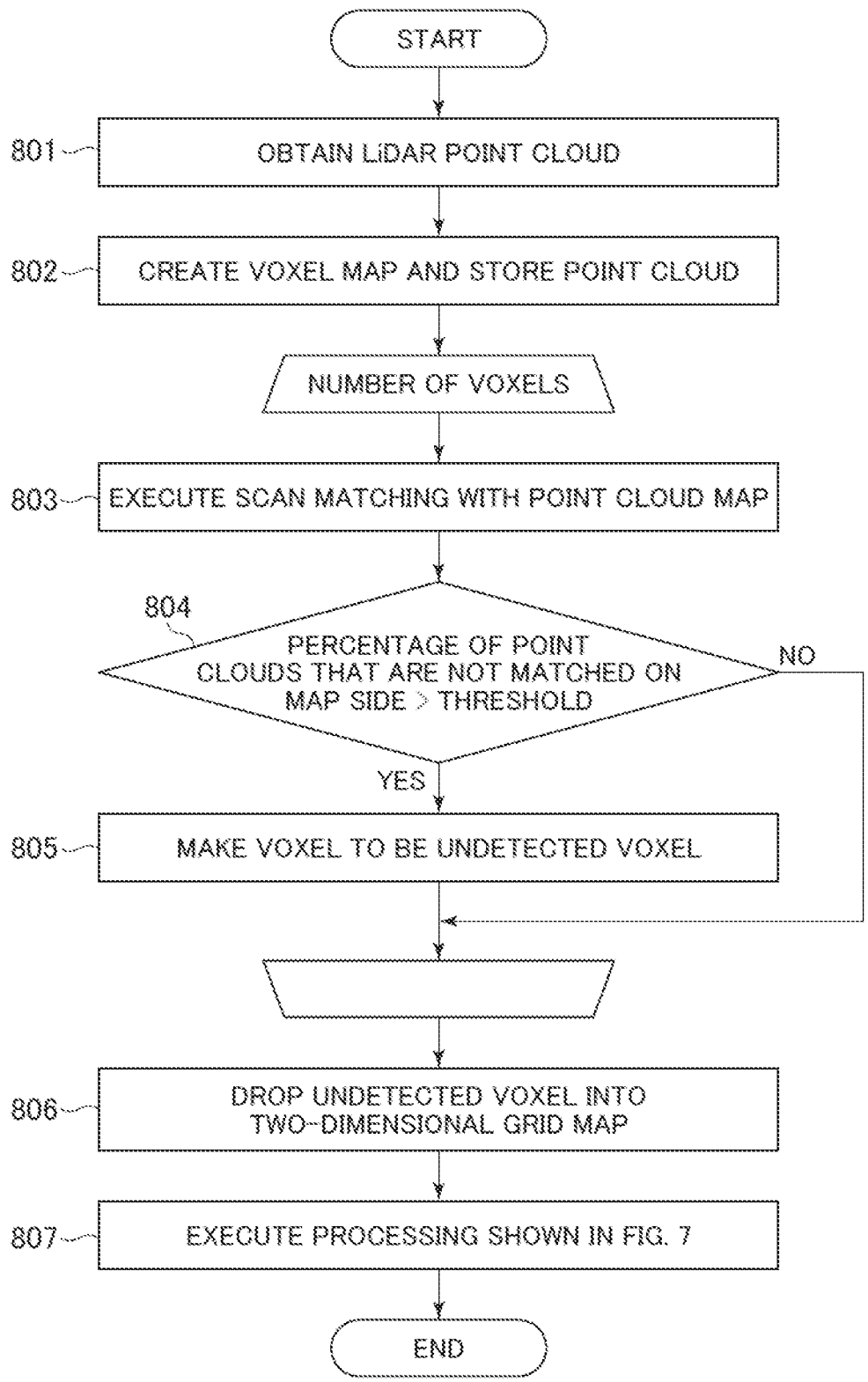

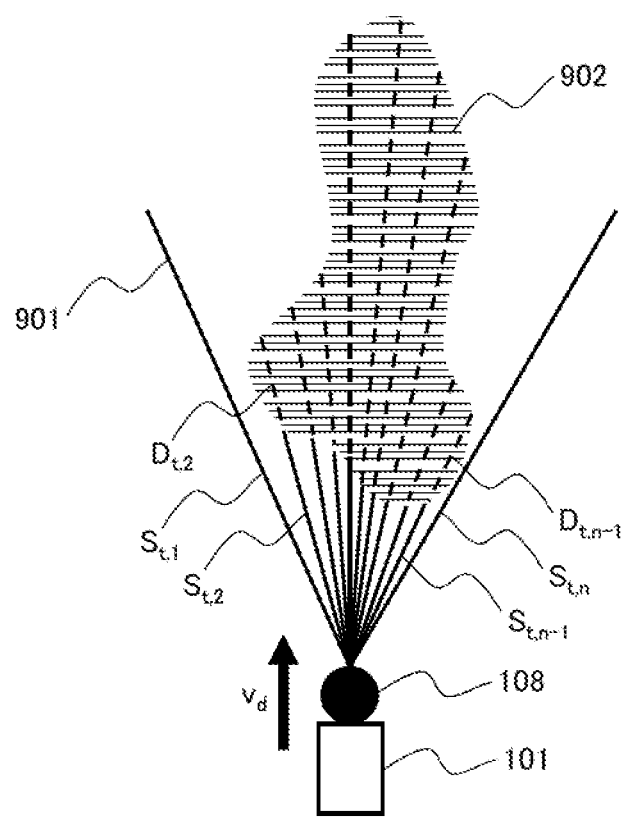

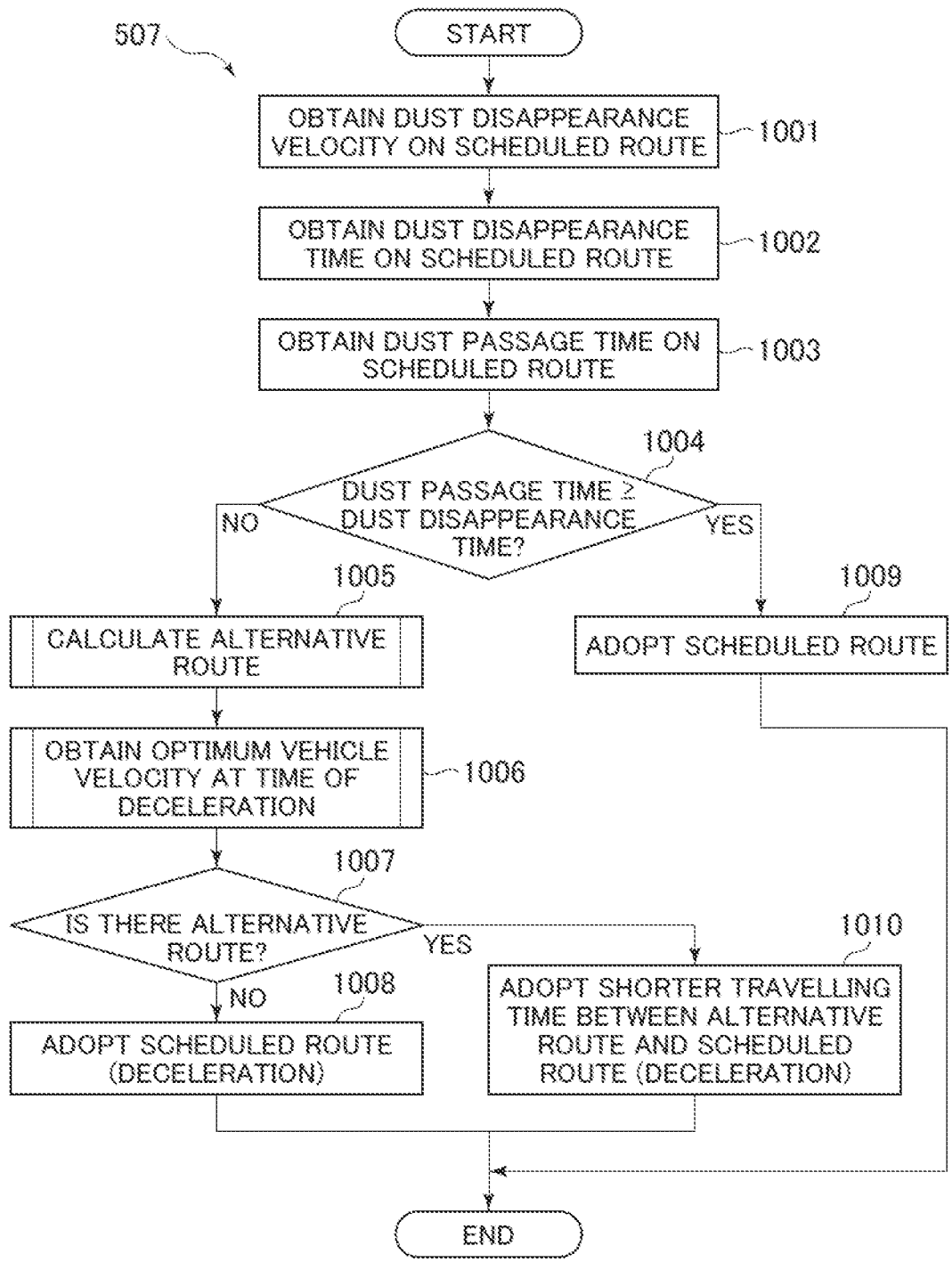

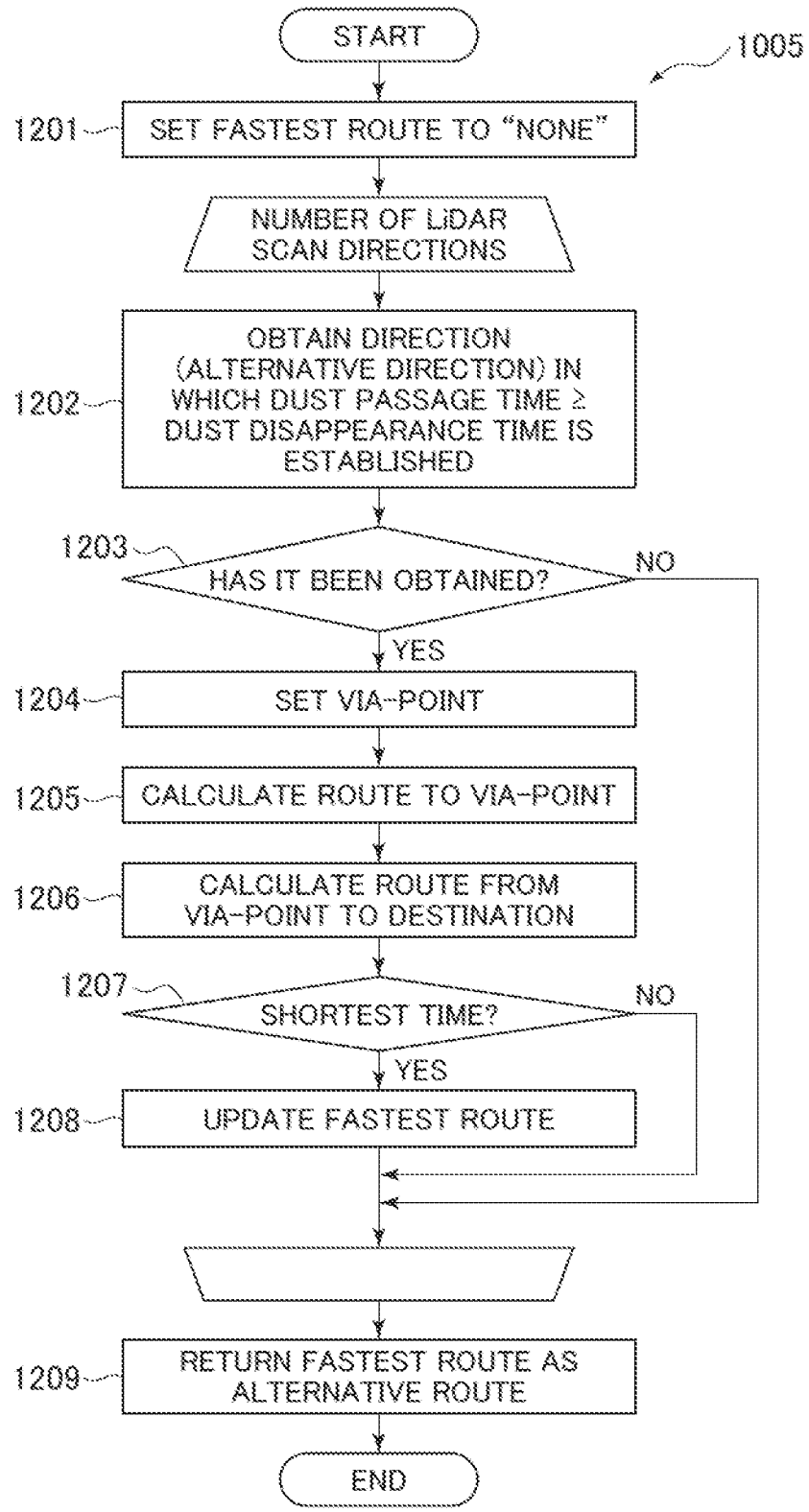

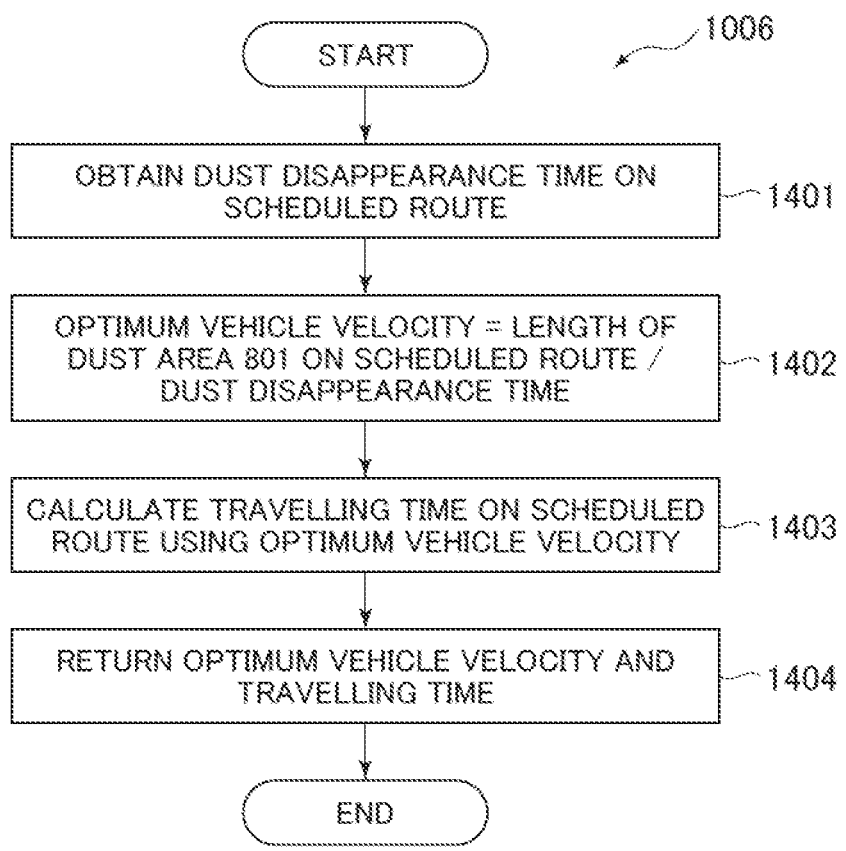

FIG. 16A  FIG. 16B  FIG. 16C
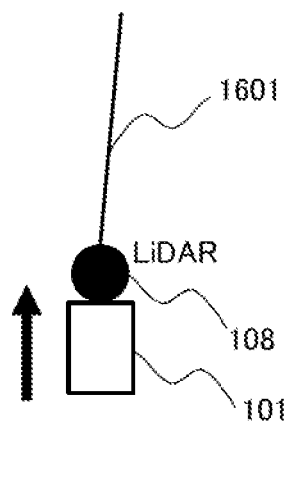
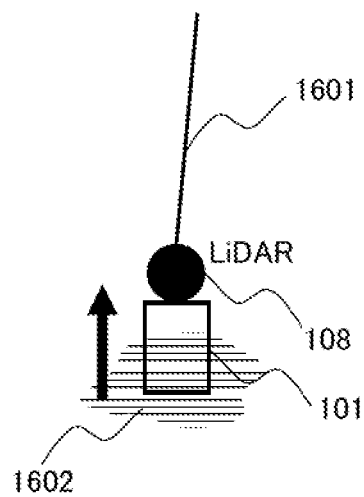
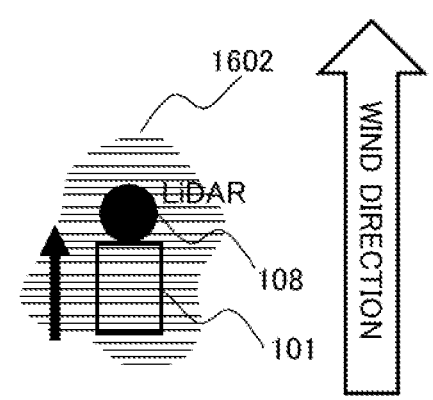
FIG. 16D  FIG. 16E
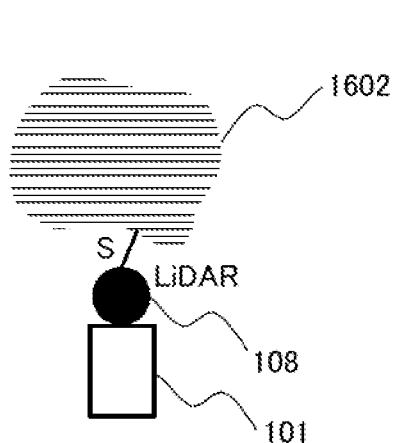
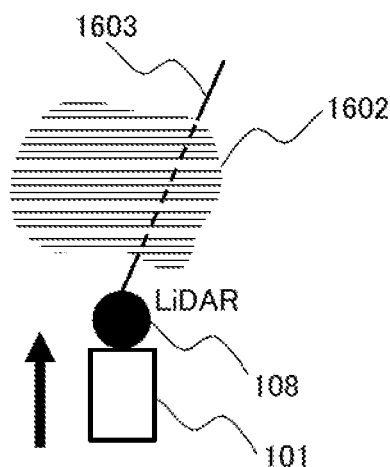

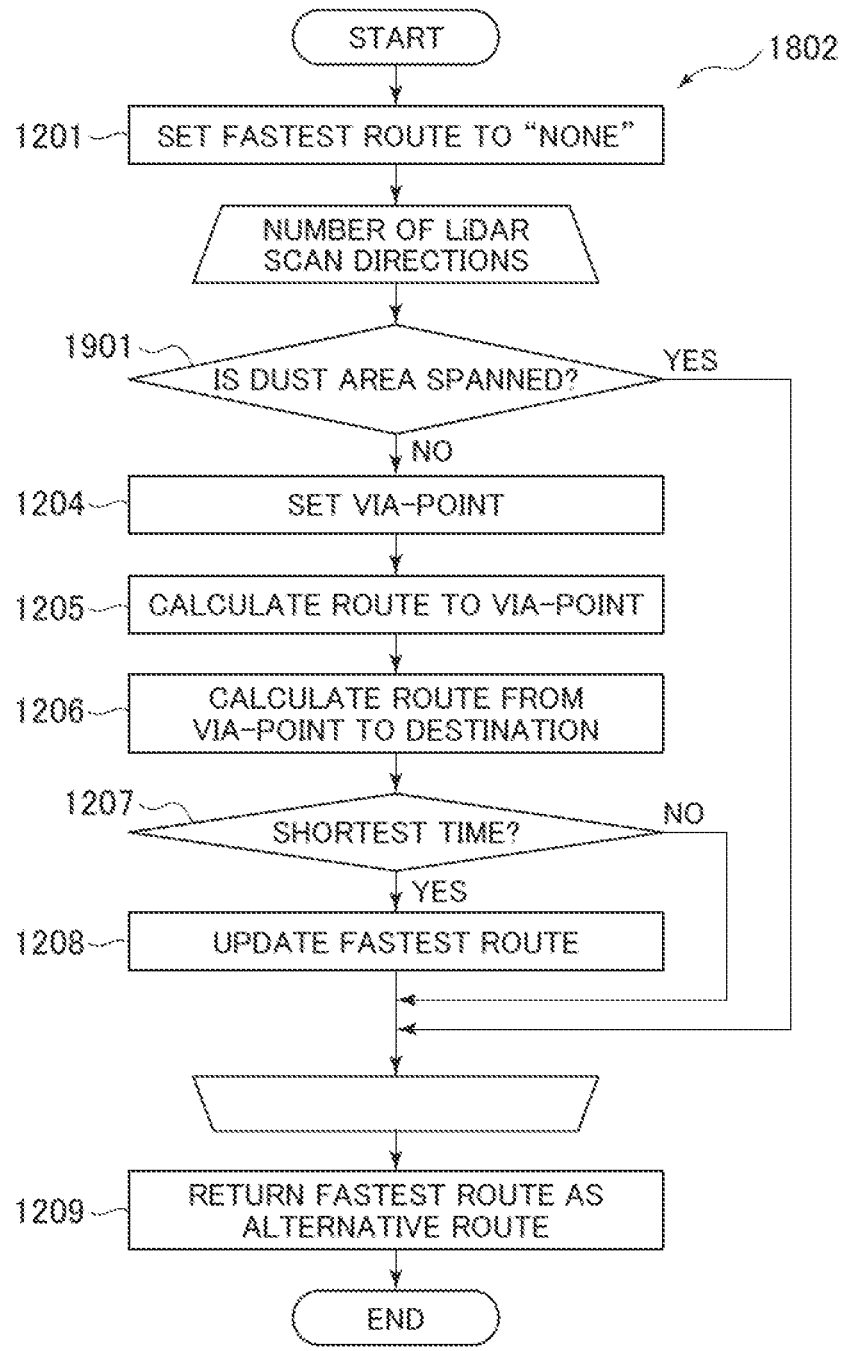

AUTONOMOUS TRAVELLING MINE VEHICLE

TECHNICAL FIELD

The present invention relates to an autonomous travelling mine vehicle such as a dump truck.

BACKGROUND ART

For example, Patent Document 1 is a prior art document disclosing the background art of the present technical field. Patent Document 1 describes "a mining work vehicle including: a stereo camera device that includes first and second cameras capable of acquiring image information ahead of the travelling direction; a difference-free area identification section that scans, for each noticed pixel, regarding to which position in two-dimensional image information acquired by the second camera corresponds to a local area in two-dimensional image information acquired by the first camera, sets a specified value indicating that there is no corresponding point for the noticed pixel when the corresponding local area is not sensed in image information acquired by the second camera, and identifies an area occupied by the pixel for which the specified value is set as a difference-free area; and an obstacle area identification section that identifies the difference-free area as an obstacle area with a high probability of the presence of an obstacle when the number of pixels of the difference-free area in the image information is larger than a predetermined value".

PRIOR ART DOCUMENT

Patent Document

Patent Document 1: U.S. Pat. No. 6,385,745

SUMMARY OF THE INVENTION

Problem to be Solved by the Invention

At mine sites, for example, a mine vehicle such as an autonomous travelling dump truck is used to improve productivity. In the autonomous travelling dump truck, operation management is performed using control information, and in order to secure the safety of travelling, autonomous travelling is controlled by constantly grasping the surrounding situation during the travelling of each autonomous travelling dump truck and detecting the presence or absence of obstacles and other vehicles. On the other hand, in off-road environments such as mine sites, dust is frequently generated and obstacles hidden by the dust cannot be detected in some cases.

In view of this, Patent Document 1 discloses a technique that uses a stereo camera to define an area where a corresponding point cannot be obtained as a dust area when the number of pixels of the area is larger than a predetermined value, and determines whether or not the dust is caused by vehicle travelling by using the size and positional relationship of the detected obstacle, thereby enabling avoidance of the vehicle. However, in Patent Document 1, it is only possible to avoid the obstacle and is not assumed to pass through the area where the dust is generated. Thus, work efficiency decreases each time dust is generated.

In addition, when using a LiDAR, there is a possibility that point cloud data in a dust generation area cannot be acquired due to a decrease in laser transmittance caused by dust. Also in this case, the mine vehicle stops and decelerates each time to wait for the dust to disappear, and thus the work efficiency decreases.

The present invention has been made in view of the above problems, and an object thereof is to provide an autonomous travelling mine vehicle that can suppress a decrease in work efficiency when dust is generated at a work site.

Means for Solving the Problem

In order to achieve the object, the present invention provides an autonomous travelling mine vehicle including: a vehicle body; an own vehicle position measuring sensor that measures a position of the vehicle body; a travelling route setting device that sets a scheduled route of the vehicle body; and a vehicle controller that controls an advancing direction and a velocity of the vehicle body according to the position of the vehicle body measured by the own vehicle position measuring sensor and the scheduled route, in which a surrounding monitoring sensor that measures a three-dimensional point cloud of a terrain profile around the vehicle body is provided, and the travelling route setting device is configured to calculate an undetected area representing a terrain profile part that the surrounding monitoring sensor cannot measure, calculate an alternative route on which the vehicle body can travel without passing through the undetected area on the basis of positional relationship between the undetected area and the vehicle body, and update the scheduled route with the alternative route.

According to the present invention configured as described above, since the scheduled route is updated with the alternative route on which the vehicle body can travel without passing through the undetected area on the basis of the positional relationship between the undetected area and the vehicle body, a decrease in work efficiency can be suppressed when dust is generated at a work site.

Advantages of the Invention

According to the autonomous travelling mine vehicle of the present invention, it is possible to suppress a decrease in work efficiency when dust is generated at a work site.

BRIEF DESCRIPTION OF THE DRAWINGS

FIG. 8 is a flowchart for showing another example of the processing of sensing the undetected area.

FIG. 9 is a diagram for showing the positional relationship between a dust area and a LiDAR.

FIG. 10 is a flowchart of the processing of updating a scheduled route.

FIG. 12 is a flowchart of the processing of calculating an alternative route.

FIG. 14 is a flowchart of the processing of obtaining the optimum vehicle velocity at the time of deceleration.

FIG. 16 is a diagram showing an example of a dust generation status.

FIG. 19 is a flowchart (modified example) of the processing of calculating the alternative route.

MODES FOR CARRYING OUT THE INVENTION

Hereinafter, an autonomous travelling mine vehicle according to an embodiment of the present invention will be described with reference to the drawings by taking a dump truck as an example. It should be noted that in each drawing, equivalent members are denoted by the same signs, and duplicate descriptions are appropriately omitted.

First Embodiment

Figure 1:
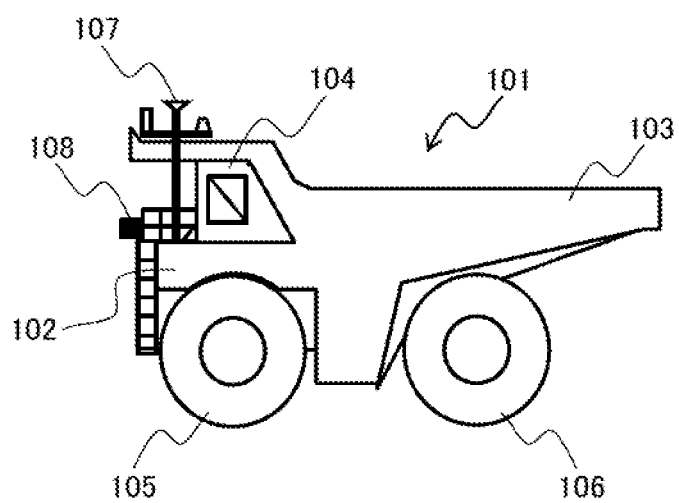
FIG. 1 is a schematic view of a dump truck.

FIG. 1 is a schematic view of a dump truck 101 according to a first embodiment of the present invention. In FIG. 1, the dump truck 101 includes a vehicle body 102, a cargo bed 103 that is mounted to the upper rear of the vehicle body 102 rotatably in the vertical direction, a driver seat 104 that is provided in the upper front of the vehicle body 102, a pair of left and right driven wheels 105 that are mounted to the lower front of the vehicle body 102, and a pair of left and right driving wheels 106 that are mounted to the lower rear of the vehicle body 102. A GNSS 107 is mounted to the upper front of the vehicle body 102 as an own vehicle position measuring sensor. The GNSS 107 measures the position of the vehicle body 102 using satellite radio waves of GPS (Global Positioning System) and the like. A LiDAR 108 is mounted to the front of the vehicle body 102 as a surrounding monitoring sensor.

The LiDAR 108 has a configuration in which data is acquired by emitting a laser and using reflected waves. The LiDAR 108 has a model-specific viewing angle in the horizontal direction and the vertical direction, and obtains, by emitting a plurality of lasers within the viewing angle and using the reflected waves, data such as the three-dimensional coordinates of the position where the laser is reflected and the reflection intensity. This data is generally called point cloud data. Unlike cameras, the LiDAR 108 can obtain the point cloud data independent of ambient brightness, and can detect an object regardless of day and night, or weather.

Figure 2:
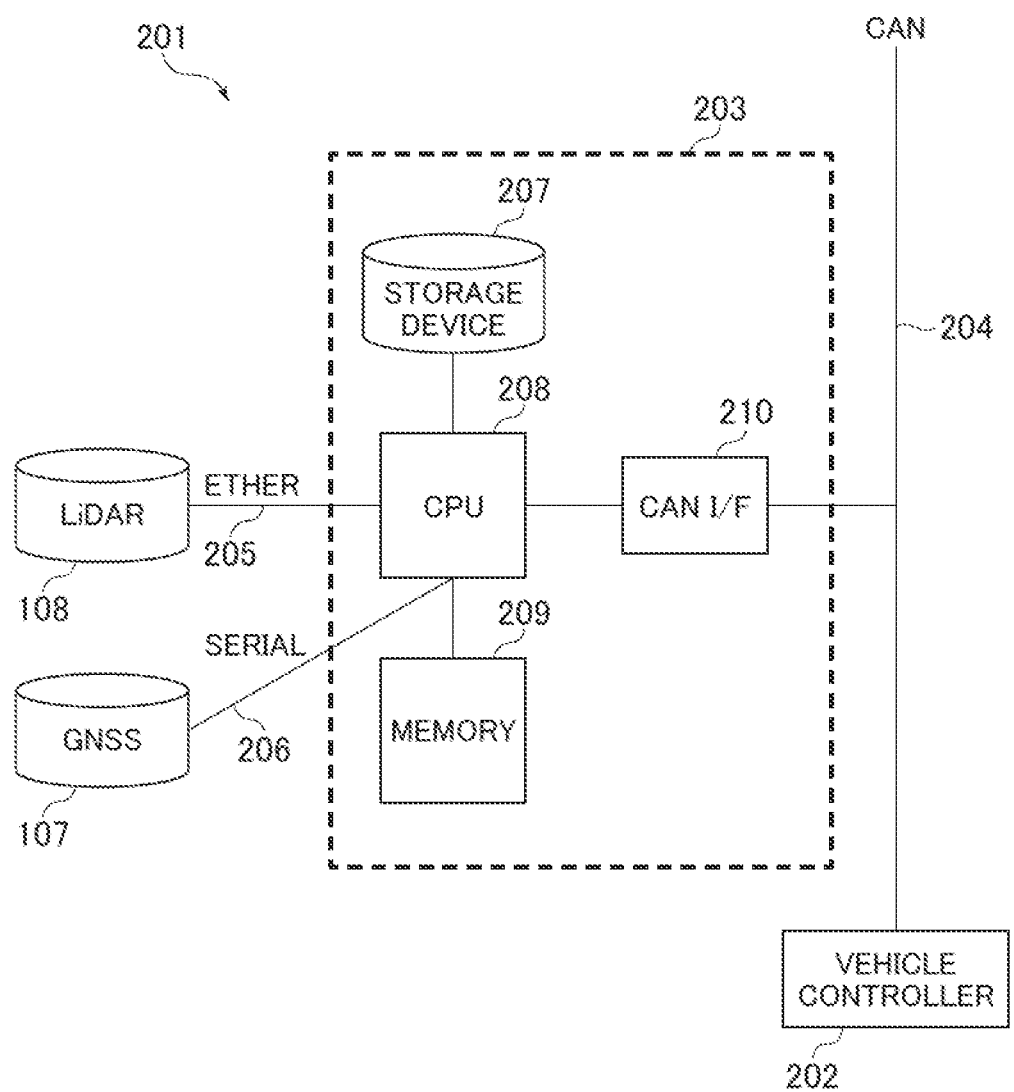
FIG. 2 is a diagram for showing a travelling control system.

FIG. 2 is a diagram for showing a travelling control system 201 mounted on the dump truck 101. The travelling control system 201 in the present embodiment consists of the GNSS 107, the LiDAR 108, a vehicle controller 202, and a travelling route setting device 203. The travelling route setting device 203 is connected to the vehicle controller 202 via a CAN bus 204, to the LiDAR 108 via an Ethernet line 205, and to the GNSS 107 via a serial line 206.

The travelling route setting device 203 includes a storage device 207, a CPU 208, a memory 209, and a CAN interface 210. The storage device 207 stores data, such as map data, necessary for automatic driving, but can also store the values of calibration parameters of the LiDAR 108.

The CPU 208 processes the point cloud data obtained by the LiDAR 107, stores data required in the process and the processing result in the memory 209, and transmits them to the CAN interface 210. The CAN interface 210 transmits the information of the processing result received from the CPU 208 to the vehicle controller 202 via the CAN bus 204. The vehicle controller 202 controls the advancing direction and the velocity of the vehicle on the basis of the processing result of the CPU 208. In addition, the CPU 208 can also acquire dead reckoning information such as the advancing direction and the velocity of the vehicle, which are created and stored in the vehicle controller 202, via the CAN interface 210.

Figure 3:
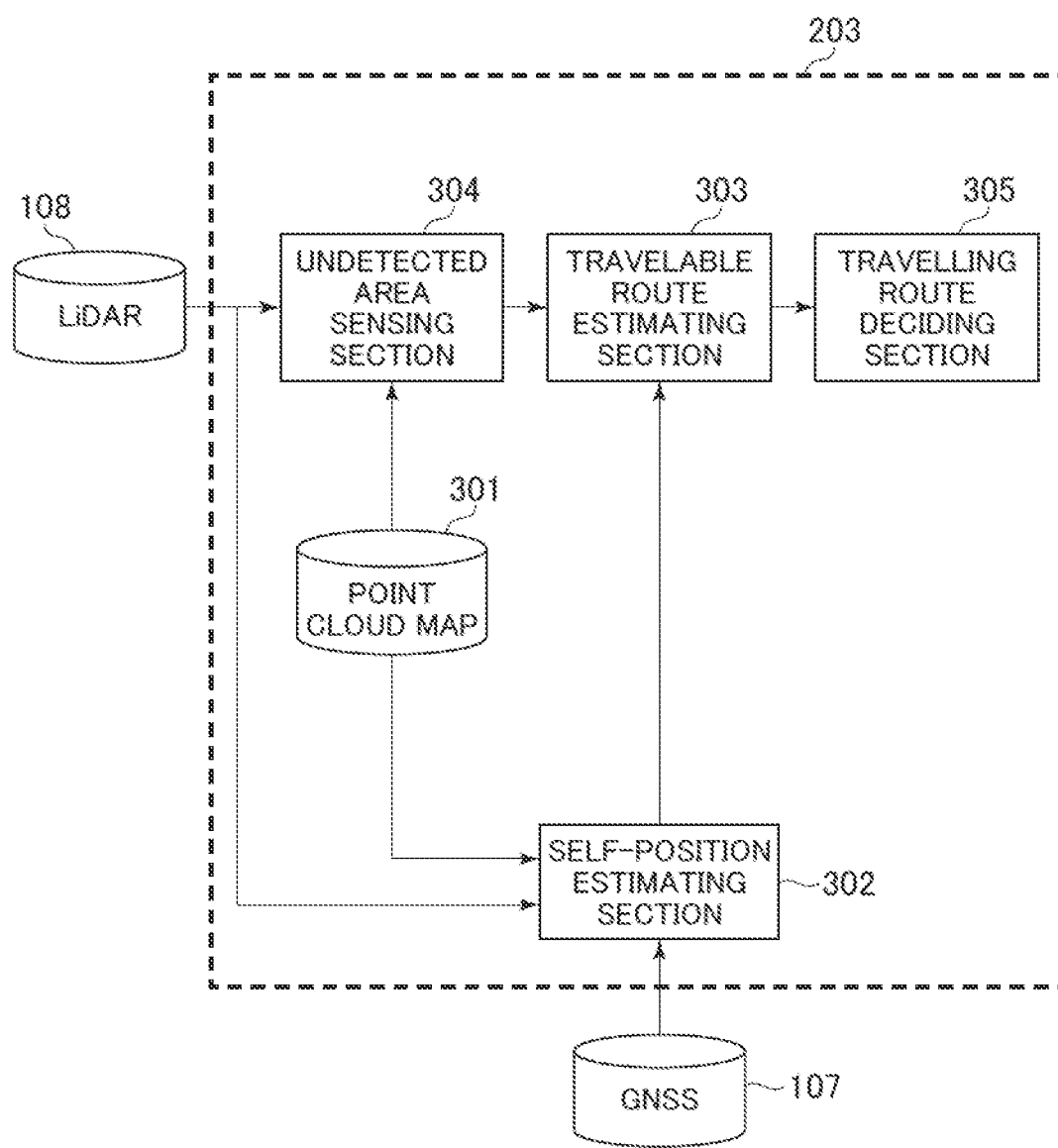
FIG. 3 is a functional block diagram of a travelling route setting device.

FIG. 3 is a functional block diagram of the travelling route setting device 203. A point cloud map 301 is point cloud data representing the terrain profile of the work site, and is acquired by allowing the mine vehicle to travel at the work site in advance. The point cloud map 301 is used for a self-position estimation technique called SLAM (Simultaneous Localization And Mapping). Self-position estimation is made possible by scan matching between point cloud data newly obtained when travelling at the work site and the point cloud map 301. This function is realized by a self-position estimating section 302. It should be noted that the self-position estimating section 302 can also estimate the self-position by the GNSS 107 without using the SLAM.

An undetected area sensing section 304 senses an area (undetected area) where the point cloud data of the LiDAR cannot be obtained. When dust is generated due to travelling of other vehicles or the like, the transmittance of the laser emitted from the LiDAR 108 is reduced and reflected waves cannot be obtained in some cases, in which the undetected area is generated. A travelable route estimating section 303 estimates travelable routes by considering the undetected area obtained by the undetected area sensing section 304. A travelling route deciding section 305 decides a scheduled route from among the travelable routes estimated by the travelable route estimating section 303. These processing will be described later.

Figure 4:
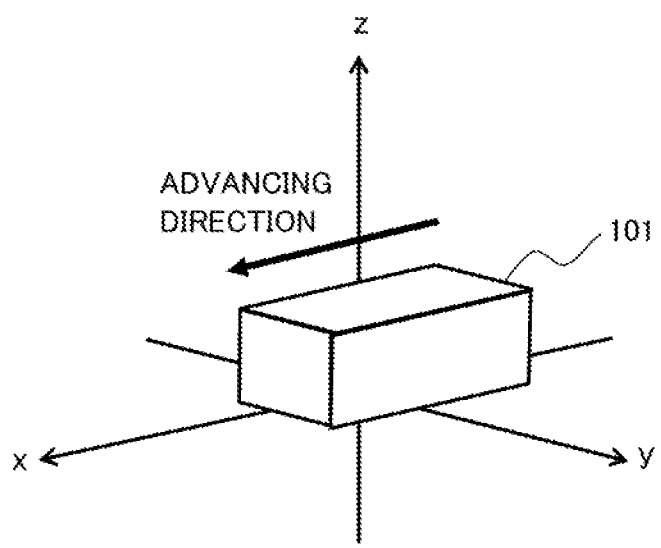
FIG. 4 is a diagram for showing an example of a coordinate system.

FIG. 4 is a diagram for showing an example of a coordinate system used in the present embodiment. In this coordinate system, the position of the dump truck 101 is set as the origin, the advancing direction of the dump truck 101 is set as the x-axis, the vehicle width direction is set as the y-axis, and the direction perpendicular to the road surface is set as the z-axis. It should be noted that the value of the y-axis is positive on the left side toward the advancing direction of the dump truck 101.

Figure 5:
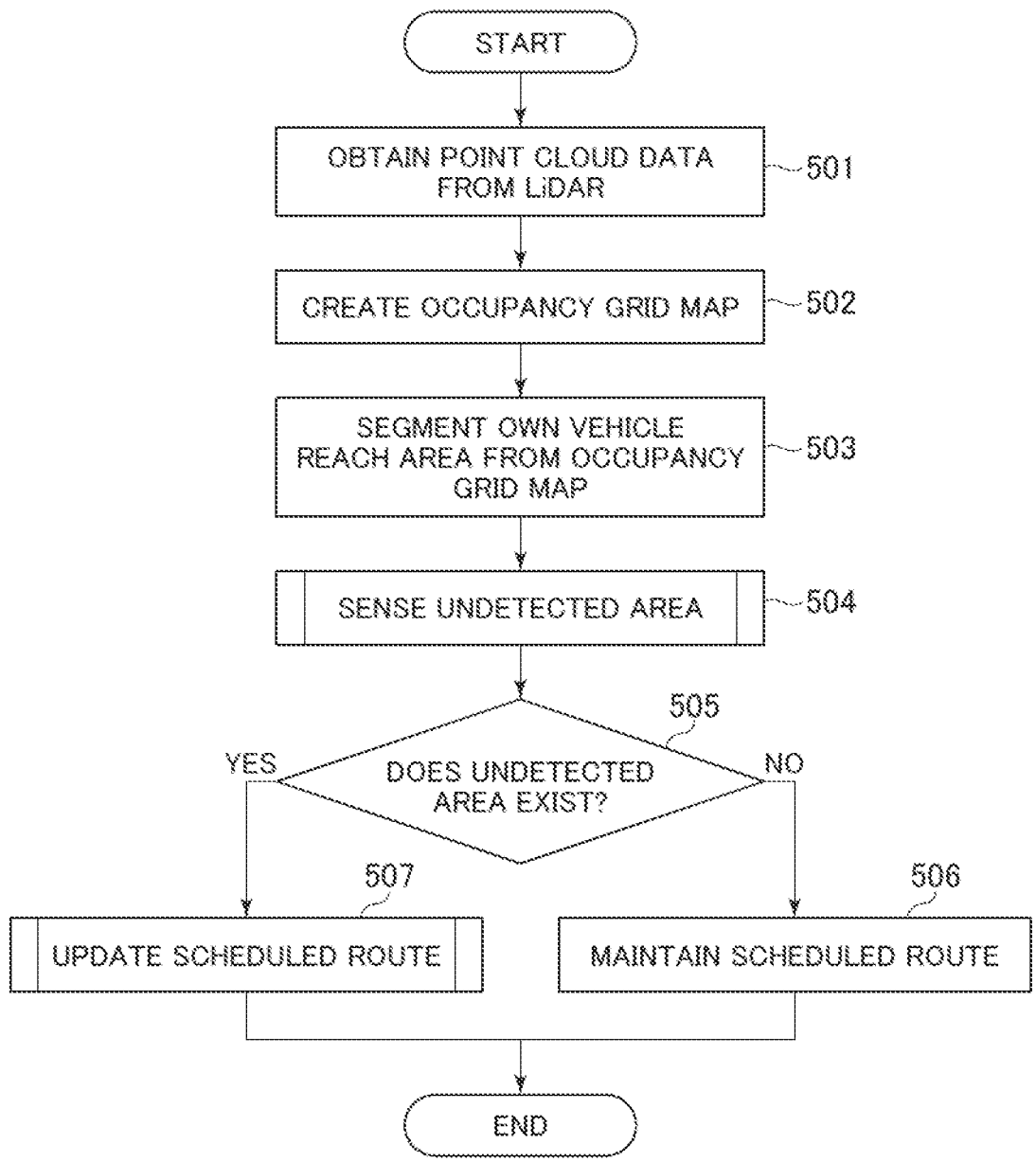
FIG. 5 is a flowchart for showing the processing of the travelling route setting device.

FIG. 5 is a flowchart for showing the processing of the travelling route setting device 203. First, in Step 501, the point cloud data is obtained from the LIDAR 108. Next, in Step 502, an occupancy grid map (OGM) is created using the obtained point cloud data. The occupancy grid map in the present embodiment is a grid map of an orthogonal coordinate system in which the advancing direction is the x-axis and the direction crossing it vertically is the y-axis, and each cell has a predetermined size.

In Step 502, the coordinate value of a cell is obtained from the coordinate value of the point cloud data, and the coordinate value of the point cloud data is added to information of the cell. Thus, there are a case where each cell does not hold a point cloud coordinate value, and a case where each cell holds at least one point cloud coordinate value.

Next, in Step 503, an own vehicle reach area is segmented from the occupancy grid map. The own vehicle reach area is the area that the own vehicle can reach when the own vehicle applies the brake while the own vehicle is advancing, and is the minimum necessary area that the own vehicle should monitor while advancing.

Next, in Step 504, an undetected area is sensed. This is the processing of the undetected area sensing section 304. Here, the undetected area refers to an area where the point cloud data cannot be obtained due to floating substances such as dust. The sensing processing of the undetected area will be described later.

Next, in Step 505, it is determined whether or not the undetected area exists on the basis of the sensing result of the undetected area, and if the undetected area does not exist, the processing proceeds to Step 506 to maintain the scheduled route. If the undetected area exists, the processing proceeds to Step 507 to update the scheduled route. The details of Step 507 will be described later.

Figure 6:
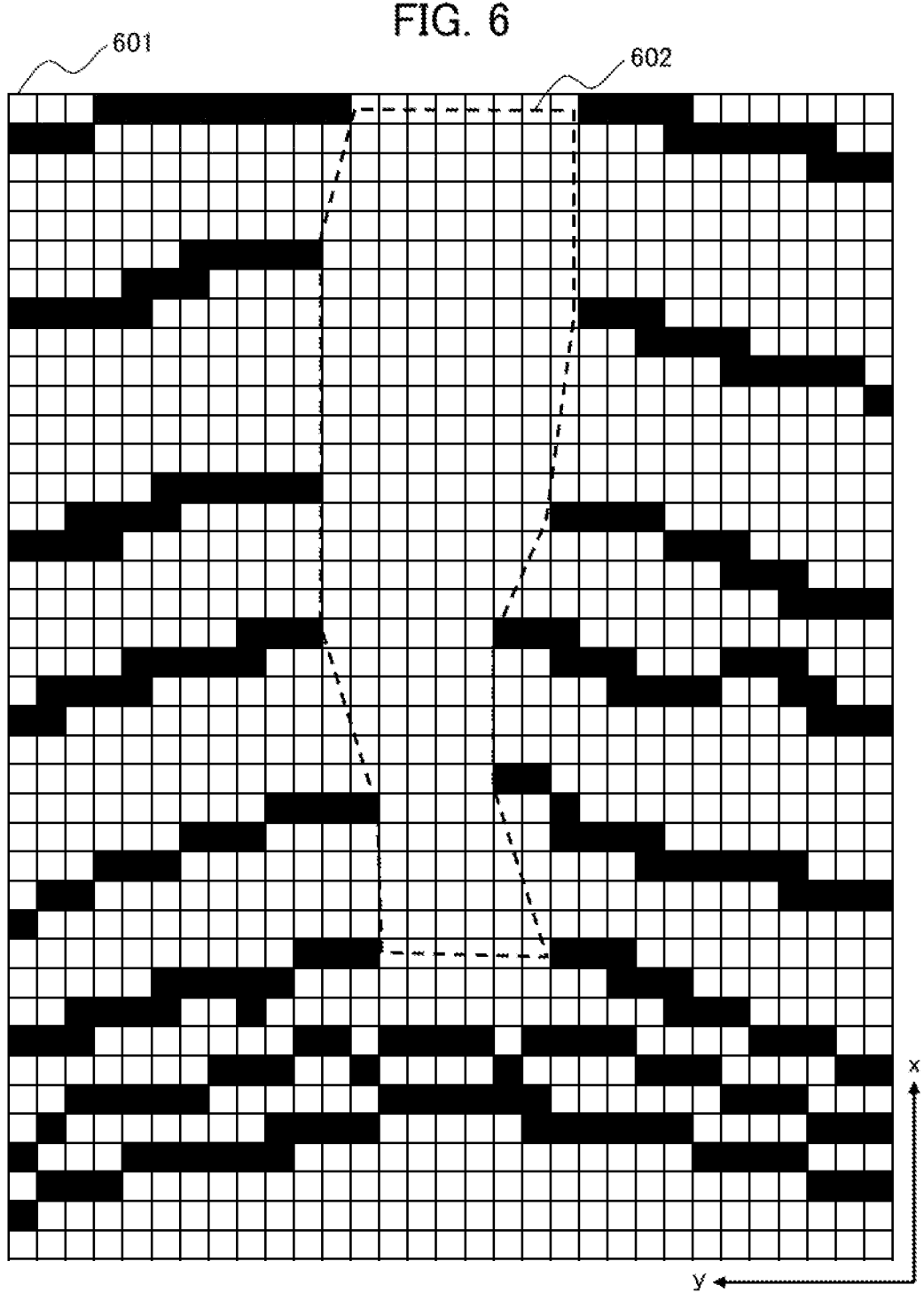
FIG. 6 shows an example of an occupancy grid map when an undetected area due to dust is generated.

FIG. 6 is an example of the occupancy grid map when the undetected area due to dust is generated, and shows a grid map 601 of areas (own vehicle reach areas) that the own vehicle can reach when the own vehicle applies the brake while the own vehicle is advancing. The cells shown in black are cells where the point cloud data has been obtained from the LiDAR 108, and the cells shown in white are cells where the point cloud data has not been obtained. An area 602 surrounded by the dashed line in FIG. 6 is the area (undetected area) where the point cloud data has not been obtained due to dust.

Figure 7:
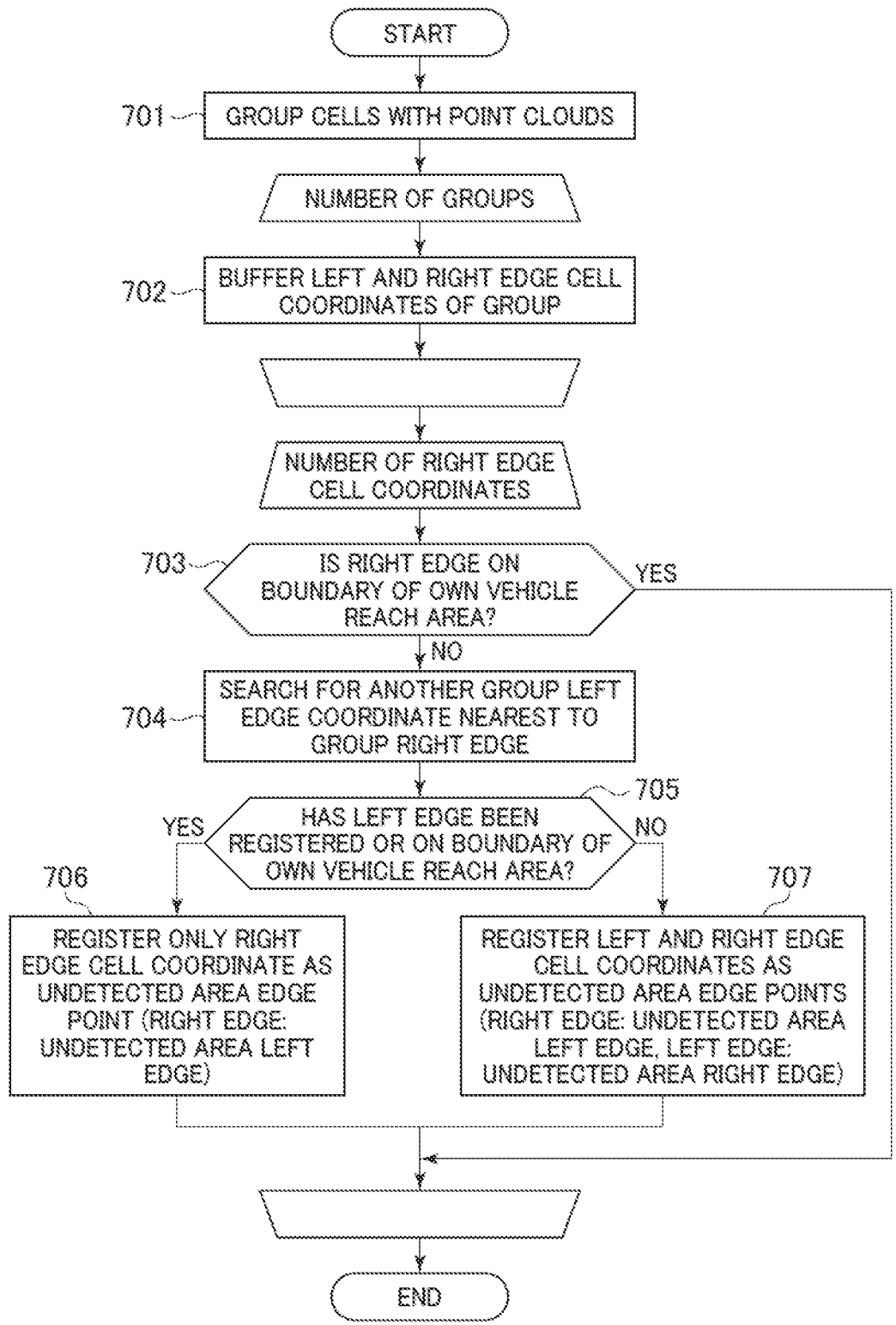
FIG. 7 is a flowchart for showing an example of the processing of sensing the undetected area.

FIG. 7 is a flowchart for showing an example of the processing (Step 504 in FIG. 5) of sensing the undetected area. First, in Step 701, cells with point clouds in the occupancy grid map are grouped. This is the processing of gathering the cells with point clouds that exist in the vicinity into one. As the processing of the grouping, it is conceivable that for example, if there are cells with point clouds by searching for cells in the vicinity of 8 cells starting from a certain cell, they are put in the same group, and groups can be extracted by recursively executing this processing.

Next, the loop is turned with the number of extracted groups, and the left and right edge cell coordinates of the groups are buffered in Step 702.

The processing leaves the loop with the number of groups and enters the loop with the number of buffered right edge cell coordinates. After obtaining one right edge cell coordinate, it is determined in Step 703 whether or not the coordinate is on the boundary of the own vehicle reach area. If it is on the boundary of the own vehicle reach area, the next right edge cell coordinate is obtained, and the same processing is repeated. Otherwise, since it can be regarded as the right edge cell coordinate of the group, the processing proceeds to Step 704 to search for the left edge coordinate of another group nearest to the cell coordinate. Next, in Step 705, it is determined whether the searched left edge coordinate has been registered or is on the boundary of the own vehicle reach area. If it is on the boundary of the own vehicle reach area, only the right edge cell coordinate is registered in Step 706. At this time, the right edge cell coordinate is registered as the left edge coordinate of the undetected area. If the searched left edge coordinate has not been registered or is not on the boundary of the own vehicle reach area, the processing proceeds to Step 707 to register both the right edge cell coordinate and the left edge cell coordinate. At this time, the right edge cell coordinate is registered as the left edge coordinate of the undetected area, and the left edge cell coordinate is registered as the right edge coordinate of the undetected area.

The inside of the closed curve obtained by connecting the right edge coordinates of the undetected areas registered by these processing to each other and connecting the left edge coordinates thereof to each other and by further connecting the upper edges thereof to each other and connecting the lower edges thereof to each other becomes the undetected area.

FIG. 8 is a flowchart for showing another example of the processing (Step 504 in FIG. 5) of sensing the undetected area. In this example, the undetected area is sensed by using scan matching between the point clouds.

First, point cloud data is obtained in Step 801. This is the point cloud data newly acquired from the LiDAR 108. Next, in Step 802, a voxel map is generated, the coordinate value of the voxel is obtained from the coordinate value of the point cloud data, and the coordinate value of the point cloud data is added to information of the voxel. Thus, there are a case where each voxel does not hold a point cloud coordinate value, and a case where each voxel holds at least one point cloud coordinate value.

Next, the processing enters a loop with number of voxels. In Step 803, scan matching between the preliminarily-held point cloud map 301 and the newly-obtained point cloud data is executed. That is, the new point cloud data is collated with the point cloud map 301. This makes it possible to estimate the current position of the own vehicle. For the scan matching, it is preferable to use algorithms such as NDT (Normal Distributions Transform) and ICP (Iterative Closest Point).

Since the scan matching cannot be performed in areas where new point cloud data cannot be obtained due to dust, this can be used to detect the undetected area due to dust. Therefore, in Step 804, the point cloud that could not be matched on the point cloud map 301 side in each voxel is extracted, and the percentage and threshold thereof are compared with each other. If the threshold is exceeded, the voxel is made to be an undetected voxel in Step 805.

After leaving the loop with the number of voxels, the undetected voxel is dropped into the grid map in Step 806. This means that three-dimensional voxel data is converted into two-dimensional grid map data. Since the processing after the next Step 807 is similar to that shown in FIG. 7, the explanation is omitted.

FIG. 9 is a diagram for showing the positional relationship between a dust area and the LiDAR 108. In the drawing, the distance (dashed line part) of a dust area 902 in each scan line 901 in the horizontal direction of the LiDAR 108 is represented by D, and the distance (solid line part) to the dust area 902 is represented by S. Here, the subscript t is the time and n is the total number of scan lines. Together with the dump truck 101, the LiDAR 108 is moving toward the dust area 902 at a vehicle velocity $v_d$.

At this time, the rate of change in the distance to the dust area 902 at time t, that is, a dust disappearance velocity is represented by Equation 1.

[Expression 1]

$$v_{t,n} = \frac{S_{t+1,n} - S_{t,n}}{t_u} \qquad \text{(Equation 1)}$$

Here, $t_u$ is a unit time, and for example, a time period for obtaining point cloud data is suitable. Then, if the relationship of Equation 2 is established on the scheduled route, the dump truck 101 can advance on the scheduled route without entering the dust area.

[Expression 2]

$$\frac{S_{t,n} + D_{t,n}}{v_d} \geq \frac{D_{t,n}}{v_{t,n}} \quad \text{(Equation 2)}$$

Here, the left side of Equation 2 is the time (dust passage time) required to pass through the dust area at the present time, and the right side is the time (dust disappearance time) required for the dust area to disappear. That is, on the basis of the observation result in unit time, the relationship between the dust passage time and the dust disappearance time is obtained to determine whether to travel on the scheduled route or to travel on an alternative route.

This determination processing will be described with reference to FIG. 10. FIG. 10 is a flowchart of the processing (Step 507 in FIG. 5) of updating the scheduled route. First, in Step 1001, a dust disappearance velocity $v_{t,n}$ on the scheduled route is obtained. Next, in Step 1002, the dust disappearance time on the scheduled route is obtained. Next, in Step 1003, the dust passage time on the scheduled route is obtained. Next, in Step 1004, it is determined whether "dust passage time dust disappearance time" is established, and if it is established, the processing proceeds to Step 1009 to adopt the scheduled route. Otherwise, an alternative route is calculated in Step 1005, and then in Step 1006, the optimum vehicle velocity for deceleration on the scheduled route is obtained. Step 1006 includes a determination to calculate such a velocity that the dump truck 101 does not enter the dust area, and to set the velocity to 0 (stop the vehicle) in some cases. Next, in Step 1007, it is determined whether or not the alternative route has been calculated by the processing of Step 1005, and if it has not been calculated, the scheduled route is adopted and the vehicle velocity calculated in Step 1006 is output to the vehicle controller 202. This causes the dump truck 101 to decelerate or stop on the scheduled route. On the other hand, if the alternative route has been calculated, the processing proceeds to Step 1010 in which the travelling time when travelling on the alternative route is compared with the travelling time when travelling on the scheduled route at a reduced velocity, and the route with the shorter travelling time is adopted.

By the way, it is known that the laser transmittance of the LiDAR 108 follows the laser radar equation of Equation 3.

[Expression 3]

$$P_r = \frac{C \times \exp(-2\sigma R)}{R^2} \quad \text{(Equation 3)}$$

Here, $P_r$ is the reception intensity of reflected waves, C is a constant, $\sigma$ is an attenuation coefficient, and R is the distance from the LiDAR 108. According to the laser radar equation, the transmittance of the laser is inversely proportional to the distance from the LiDAR 108, and therefore, even if the transmittance of the laser is reduced due to dust, the field of view recovers faster as the distance from the LiDAR 108 is closer.

Figure 11A:
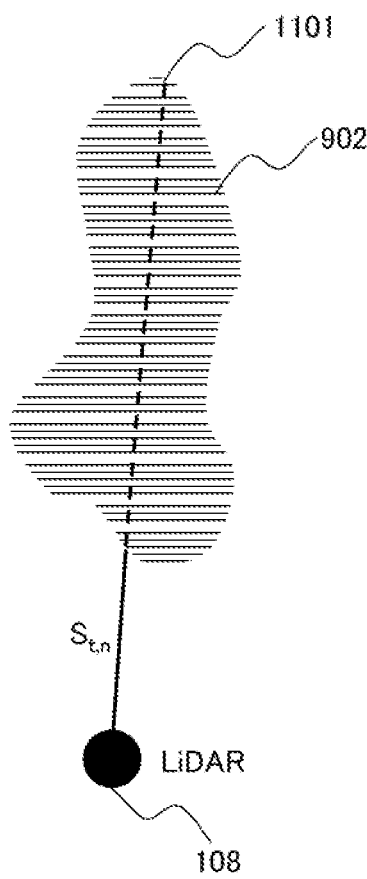
FIG. 11 is a diagram showing an example of changes with time of a dust area 801.
Figure 11B:
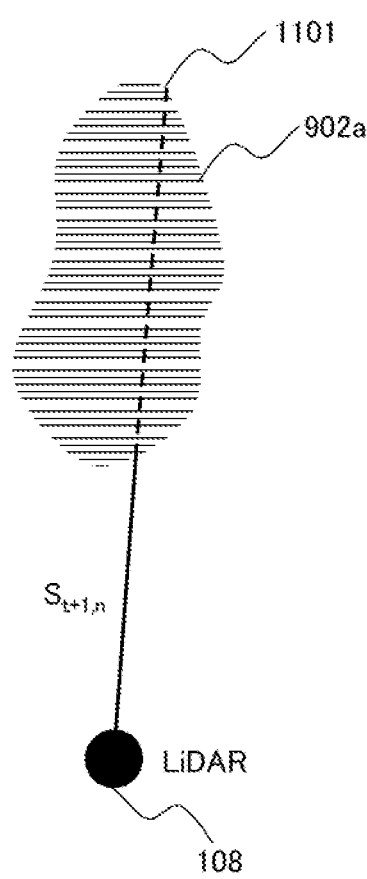
Figure 11C:
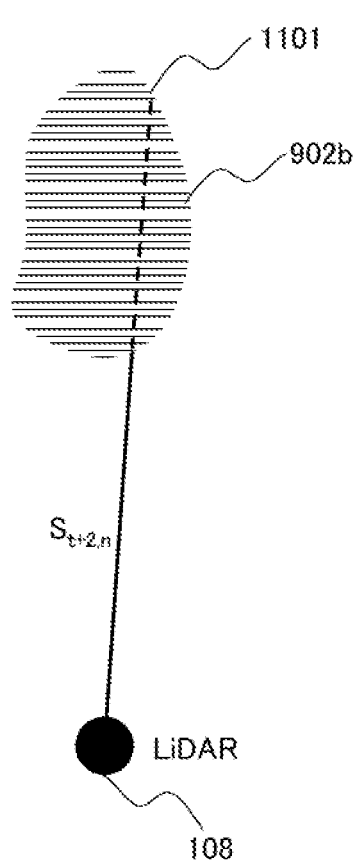

On the basis of this, an example of changes with time of the dust area 902 is shown in FIG. 11. FIG. 11 shows changes in the distance S from the LiDAR 108 to the dust area 902 on a scheduled route 1101, and the state at time t shown in FIG. 9 is shown in FIG. 11A. Here, it is assumed that the position of the LiDAR 108 is not moved. The distance to the dust area 902 at this time is $S_{t,n}$. In the drawing, FIG. 11B is the state at time t+1 when the next point cloud data has been obtained, and the distance to the dust area 902a is $S_{t+1,n}$. At this time, the relationship of $S_{t,n} < S_{t+1,n}$ is established. In the drawing, FIG. 11C is the state at time t+2 when the next point cloud data has been further obtained, and the distance to the dust area 902b is $S_{t+2,n}$. At this time, the relationship of $S_{t+1,n} < S_{t+2,n}$ is established, and as a result, the relationship of $S_{t,n} < S_{t+1,n} < S_{t+2,n}$ is established. Thus, the field of view of the LiDAR 108 when dust is generated recovers faster as being closer to the LiDAR 108.

FIG. 12 is a flowchart of the processing (Step 1005 in FIG. 10) of calculating the alternative route. First, in Step 1201, the shortest route is set to "none." That is, the variable for storing the shortest route is initialized. Next, the processing enters a loop in the horizontal scan direction of the LiDAR 108.

In Step 1202, the direction (alternative direction) in which "dust passage time dust disappearance time" is established is obtained. The alternative direction can be calculated by Equation 1 and Equation 2 as described earlier. In Step 1203, it is determined whether or not the alternative direction has been obtained in Step 1202, and if it has not been obtained, similar processing is executed for the next scan direction.

If the alternative direction has been obtained, it is conceivable that the dump truck 101 should advance in that direction, and thus a via-point is set on the alternative direction in Step 1204, and the route from the current location to the via-point is calculated in Step 1205. Thereafter, the route from the via-point to the destination is calculated in Step 1206. At this time, the destination is the same as that set when calculating the scheduled route.

Next, in Step 1207, it is determined whether or not the travelling time on the route calculated in Steps 1205 and 1206 is the shortest among the routes calculated so far, and if it is the shortest, the fastest route is updated with the route in Step 1208. When the processing for all the scan directions is completed, the fastest route is returned as the alternative route in Step 1209.

Figure 13:
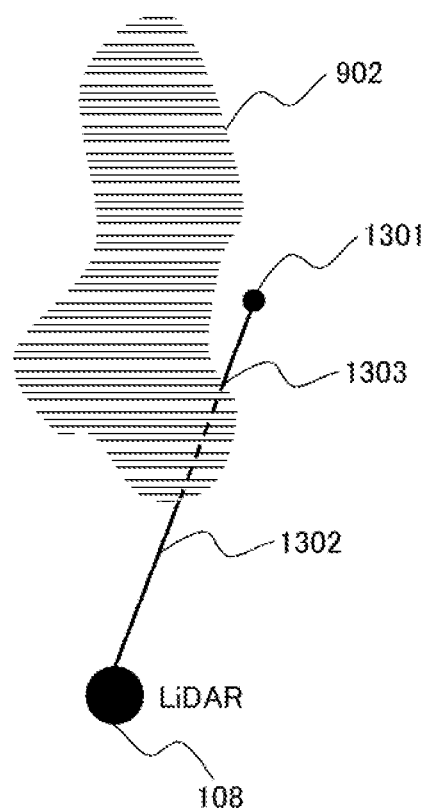
FIG. 13 is a diagram for showing a concrete example of the processing of setting a via-point.
Figure 15A:
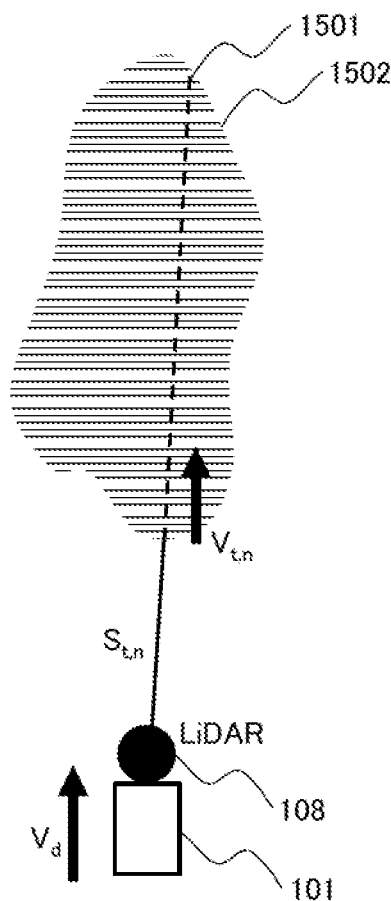
FIG. 15 is a diagram showing an example of a state in which the dump truck travels on the scheduled route when dust is generated.
Figure 15B:
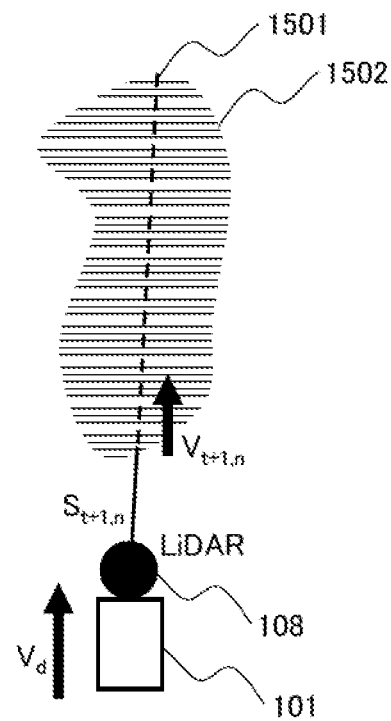
Figure 15C:
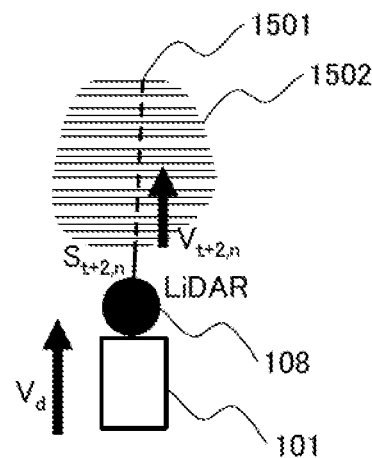
Figure 15D:
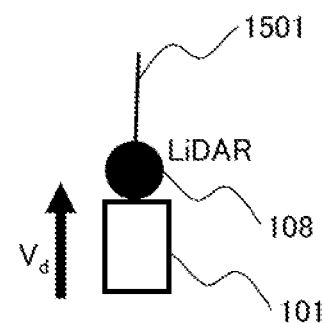

FIG. 13 is a diagram for showing a concrete example of the processing (Step 1204 in FIG. 12) of setting a via-point. A via-point 1301 is on the extension line of a scan line 1302 outside the dust area 902, and is far away from a distant intersection point 1303 between the dust area 902 and the scan line 1302. In addition, the via-point 1301 is set such that the travelling time to the destination is the shortest. Specifically, a plurality of candidates (candidate locations) for the via-point is set on the scan line 1302, the travelling time in the case of travelling to the destination via each candidate location is calculated, and the candidate location with the shortest travelling time is set as the via-point.

FIG. 14 is a flowchart of the processing (Step 1006 in FIG. 10) of obtaining the optimum vehicle velocity at the time of deceleration. First, in Step 1401, the dust disappearance time on the scheduled route is obtained. This step may be performed by reading the value already obtained in Step 1002 and recalculation is not necessarily performed. Next, in Step 1402, the optimum vehicle velocity is obtained. Here, the optimum vehicle velocity is the maximum value of the vehicle velocity at which the vehicle can travel on the scheduled route without entering the dust area. That is, the vehicle velocity v d at which the dust passage time and the dust disappearance time are equal to each other is the optimum vehicle velocity. Thus, the optimum vehicle velocity satisfies Equation 4 that is obtained by equalizing the right side and the left side of Equation 2.

[Expression 4]

$$\frac{S_{t,n} + D_{t,n}}{v_d} = \frac{D_{t,n}}{v_{t,n}} \quad \text{(Equation 4)}$$

If Equation 4 is solved for the vehicle velocity $v_d$, the optimum vehicle velocity is represented by Equation 5.

[Expression 5]

$$v_d = v_{t,n} \times \frac{S_{t,n} + D_{t,n}}{D_{t,n}} \quad \text{(Equation 5)}$$

At this time, the dump truck 101 travels so as to follow the dust area as shown in FIG. 15.

Next, the travelling time on the scheduled route is calculated in Step 1403 by using the optimum vehicle velocity calculated in Step 1402. Finally, in Step 1404, the optimum vehicle velocity obtained in Step 1402 and the travelling time obtained in Step 1403 are returned.

FIG. 15 is a diagram showing an example of a state in which the dump truck 101 travels on a scheduled route 1501 when dust is generated. In the drawing, FIG. 15A is the state at time t immediately after a dust area 1502 is generated, and the distance to the dust area 1502 is $S_{t,n}$. In the drawing, FIG. 15B is the state at time t+1 when the next point cloud data has been obtained, and the distance to the dust area 1502 is $S_{t+1,n}$. At this time, the dump truck 101 does not reach the dust area 1502, and the field of view of the LiDAR 108 can be secured. In the drawing, FIG. 15C is the state at time t+2 when the next point cloud data has been obtained, and the distance to the dust area 1502 is $S_{t+2,n}$. Also at this time, the dump truck 101 does not reach the dust area 1502, and the field of view of the LiDAR 108 can be secured. In the drawing, FIG. 15C is the state at time t+3 when the next point cloud data has been obtained, and the field of view of the LiDAR 108 can be secured due to the disappearance of the dust area. As described above, the dump truck 101 travels so as to follow the dust area without getting caught in the dust area.

FIG. 16 is a diagram showing an example of a dust generation status. The dust rolled up by the rear wheels of the dump truck 101 while the dump truck 101 travels on a scheduled route 1601 at the time of FIG. 16A flows toward the front of the dump truck 101 due to the wind blowing from the rear of the dump truck 101 as in FIG. 16B when the next point cloud data is obtained, and a dust area 1602 is generated. The field of view of the LiDAR 108 is secured at the time of FIG. 16B and the travelling of the dump truck 101 is not affected. However, when the next point cloud data is further obtained, the state becomes FIG. 16C, the dust area 1602 completely covers the LiDAR 108, and the field of view of the LiDAR 108 is lost. At this point, the distance S from the LiDAR 108 to the dust area 1602 becomes 0 in any scan direction. As a result, the dump truck 101 stops because the alternative route is not calculated by the processing of FIG. 12 and the optimum velocity on the scheduled route is not calculated by the processing of FIG. 14.

However, even in this case, the field of view recovers from the vicinity of the LiDAR 108 according to the laser radar equation of Equation 3. Accordingly, when the dust area 1602 becomes the state FIG. 16D during the stop, the field of view of the LiDAR 108 can be secured, and the distance S to the dust area 1602 becomes a positive value. Then, a scheduled route 1603 is set again by executing the processing described above.

Figure 17A:
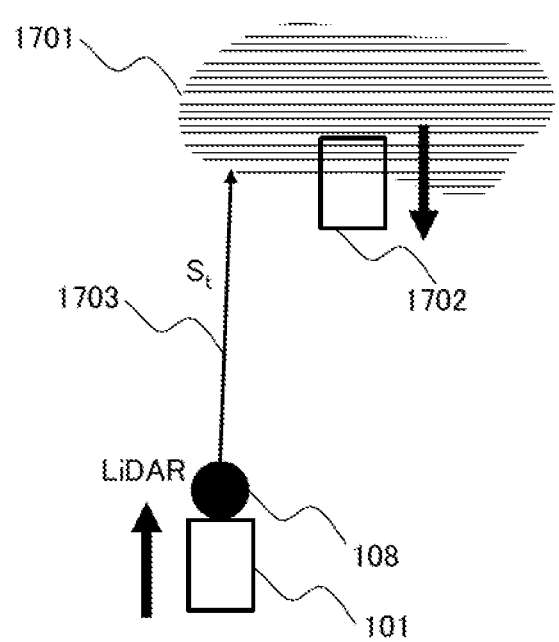
FIG. 17 is a diagram showing another example of the dust generation status.
Figure 17B:
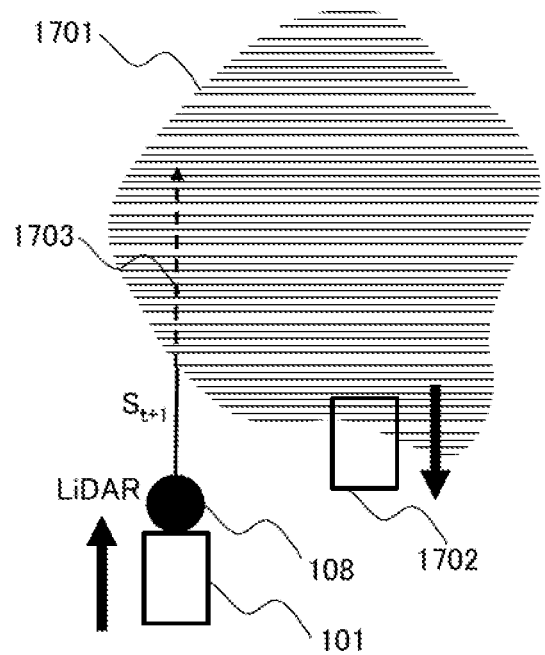
Figure 17C:
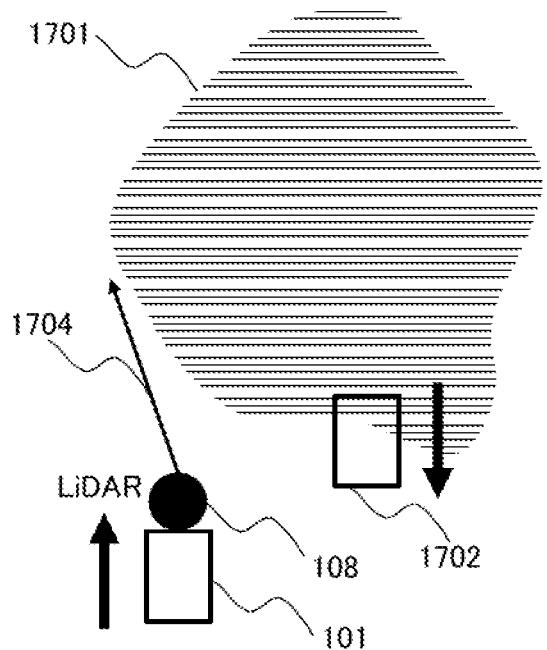

FIG. 17 is other example of the dust generation status, and show a case where an oncoming car 1702 travelling with a dust area 1701 and the own vehicle pass each other. The dump truck 101 travels on a scheduled route 1703. In the stage of FIG. 17A, the distance to the dust area 1701 is $S_t$. At the next time t+1, the state becomes FIG. 17B, and the distance $S_{t+1}$ to the dust area 1701 becomes shorter. As a result, the dust disappearance time becomes a negative value, and the scheduled route 1703 needs to be changed. Therefore, as shown in FIG. 17C, an alternative route 1704 avoiding the dust area 1701 is set as a new scheduled route, and the dump truck 101 accordingly changes the course.

As described above, even if an alternative route is not needed at the beginning of finding the dust area, in a case where the dust area spreads toward the dump truck 101, the dust disappearance velocity in Equation 1 becomes a negative value, and the dust disappearance time cannot be calculated. In such a case, the route to avoid the dust area is recalculated. The concrete processing flow will be described with reference to FIG. 18.

Figure 18:
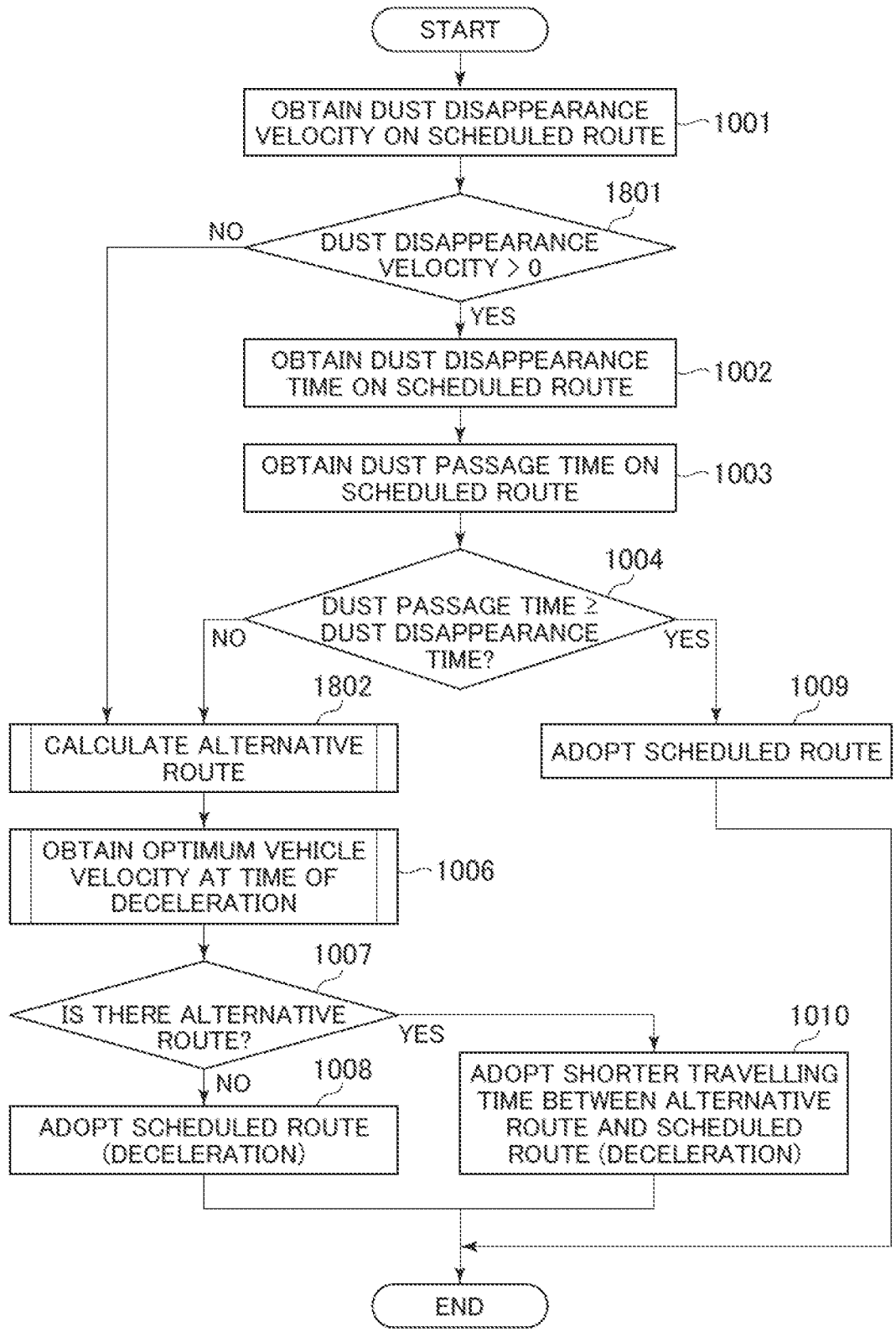
FIG. 18 is a flowchart (modified example) of the processing of updating the scheduled route.

FIG. 18 is a modified example of the flowchart of the processing of updating the scheduled route. The basic processing is similar to FIG. 10, except that the positive or negative of the dust disappearance velocity obtained in Step 1001 is determined in Step 1801. In Step 1801, if the dust disappearance velocity is a positive value, the processing proceeds to Step 1002 and subsequent steps. Where the dust disappearance velocity is a negative value, the dust approaches the dump truck 101, and there is no guarantee to secure the field of view of the LiDAR 108 on the scheduled route. Accordingly, the processing proceeds to Step 1802 to calculate an alternative route.

The processing of calculating an alternative route in Step 1802 is basically similar to Step 1005 shown in FIG. 12, except that the condition of the alternative route is that the scan direction does not span the dust area. A flowchart of Step 1802 is shown in FIG. 19. After initializing the fastest route in Step 1201, the processing enters a loop with the number of scan directions of the LiDAR 108. For each scan direction, it is determined in Step 1901 whether or not the dust area is spanned. That is, it is determined whether or not the distance D of the dust area is larger than 0. When the determination result is No, the processing proceeds to Step 1204 and subsequent steps, and when the determination result is Yes, the processing does not proceed to Step 1204 and subsequent steps.

SUMMARY

In the present embodiment, provided is an autonomous travelling mine vehicle 101 including: a vehicle body 102; an own vehicle position measuring sensor 110 that measures the position of the vehicle body 102; a travelling route setting device 203 that sets a scheduled route of the vehicle body 102; and a vehicle controller 202 that controls the advancing direction and velocity of the vehicle body 102 according to the position of the vehicle body 102 measured by the own vehicle position measuring sensor 110 and the scheduled route, in which a surrounding monitoring sensor 108 that measures a three-dimensional point cloud of a terrain profile around the vehicle body 102 is provided, and the travelling route setting device 203 calculates an undetected area 602 representing a terrain profile part that the surrounding monitoring sensor 108 cannot measure, calculates an alternative route on which the vehicle body 102 can travel without passing through the undetected area 602 on the basis of the positional relationship between the undetected area 602 and the vehicle body 102, and updates the scheduled route with the alternative route.

According to the autonomous travelling mine vehicle 101 of the present embodiment configured as above, since the scheduled route is updated with the alternative route on which the vehicle body 102 can travel without passing through the undetected area 602 on the basis of the positional relationship between the undetected area 602 and the vehicle body 102, it is possible to suppress a decrease in work efficiency when dust is generated at a work site.

In addition, the surrounding monitoring sensor 108 in the present embodiment is a ranging sensor 108 that measures the distance to a terrain profile around the vehicle body 102. Accordingly, in the autonomous travelling mine vehicle 101 including the ranging sensor 108, it is possible to suppress a decrease in work efficiency when dust is generated at a work site.

In addition, the travelling route setting device 203 in the present embodiment stores a point cloud map 301 representing a terrain profile around the vehicle body 102, and calculates an area of the three-dimensional point cloud that cannot be collated with the point cloud map 301 as the undetected area 602. Accordingly, even in a case where report missing of the surrounding monitoring sensor 108 occurs, it is possible to detect the undetected area 602.

In addition, the travelling route setting device 203 in the present embodiment assigns the three-dimensional point cloud to each cell of a grid map 601, groups adjacent cells to which the three-dimensional point cloud is assigned, and calculates, as the undetected area 602, an area having a line connecting the edge points of the groups with each other as a boundary. Accordingly, in the autonomous travelling mine vehicle 101 including the LiDAR 108, it is possible to detect the undetected area 602.

In addition, the travelling route setting device 203 in the present embodiment calculates the disappearance time (right side of Equation 2) of the undetected area and the passage time (left side of Equation 2) of the undetected area in the scheduled route. Where the passage time is equal to or more than the disappearance time, the alternative route is not calculated. Where the passage time is shorter than the disappearance time, the alternative route is calculated. Accordingly, even where dust is generated on the scheduled route, it is possible to continuously travel on the scheduled route without getting caught in the dust.

In addition, the travelling route setting device 203 in the present embodiment calculates the travelling velocity of the vehicle body 102 when the passage time and the disappearance time are equal to each other as the optimum vehicle velocity, calculates the travelling time to a predetermined destination when travelling on the scheduled route at the optimum vehicle velocity as a first travelling time, and calculates the travelling time to the destination when travelling on the alternative route as a second travelling time. Where the first travelling time is equal to or less than the second travelling time, the scheduled route is not updated with the alternative route. Where the first travelling time is longer than the second travelling time, the scheduled route is updated with the alternative route. The vehicle controller controls the vehicle velocity of the vehicle body to the optimum vehicle velocity in a case where the scheduled route is not updated with the alternative route by the travelling route setting device. Accordingly, it is possible to travel on the route with the shortest travelling time to the destination.

In addition, the vehicle controller 202 in the present embodiment stops the vehicle body 102 when neither the alternative route nor the optimum vehicle velocity is calculated by the travelling route setting device 203. Accordingly, it is possible to minimize the stop time of the autonomous travelling mine vehicle 101.

It should be noted that the present invention is not limited to the above embodiment, but includes various modified examples. For example, the above-described embodiment has been described in detail for the purpose of clearly describing the present invention and is not necessarily limited to those having all the described configurations.

In addition, it is possible to replace a part of the configuration of one embodiment with the configuration of another embodiment, and to add the configuration of one embodiment to the configuration of another embodiment. In addition, it is possible to add, delete, or replace a part of the configuration of each embodiment to, from, and with other configurations.

In addition, some or all of each of the above configurations, functions, processing sections, processing means, and the like may be realized by hardware by, for example, designing them using integrated circuits. In addition, each of the above configurations, functions, and the like may be realized by software such that the processor interprets and executes a program for realizing each function. Information of programs, tables, files, and the like for realizing each function can be placed in a memory, a recording device such as a hard disk or an SSD (Solid State Drive), or a recording medium such as an IC card, an SD card, or a DVD.

In addition, the control lines and the information lines considered to be necessary in the explanation are shown, but all the control lines and information lines in a product are not necessarily shown. In practice, almost all the configurations may be considered to be connected to each other.

DESCRIPTION OF REFERENCE CHARACTERS

101: Dump truck (autonomous travelling mine vehicle)
102: Vehicle body
103: Cargo bed
104: Driver seat
105: Driven wheel
106: Driving wheel
108: LiDAR (surrounding monitoring sensor, ranging sensor)
110: GNSS (own vehicle position measuring sensor)
201: Travelling control system
202: Vehicle controller
203: Travelling route setting device
204: CAN bus
205: Ethernet line
206: Serial line
207: Storage device
208: CPU
209: Memory
210: CAN interface
301: Point cloud map
302: Self-position estimating section
303: Travelable route estimating section
304: Undetected area sensing section
305: Travelling route deciding section
601: Grid map
602: Undetected area 901: Scan line
902, 902b, 902c: Dust area
1101: Scheduled route
1301: Via-point
1302: Scan line
1303: Distant intersection point
1501: Scheduled route
1502: Dust area
1601: Scheduled route
1602: Dust area
1603: Scheduled route
1701: Dust area
1702: Oncoming vehicle
1703: Scheduled route
1704: Alternative route

The invention claimed is:

1. An autonomous travelling mine vehicle comprising:
a vehicle body;
an own vehicle position measuring sensor that measures a position of the vehicle body;
a travelling route setting device that sets a scheduled route of the vehicle body; and
a vehicle controller that controls an advancing direction and a velocity of the vehicle body according to the position of the vehicle body measured by the own vehicle position measuring sensor and the scheduled route, wherein
a surrounding monitoring sensor that measures a three-dimensional point cloud of a terrain profile around the vehicle body is provided, and
the travelling route setting device is configured to
calculate an undetected area representing a terrain profile part that the surrounding monitoring sensor cannot measure, by excluding an area in which the three-dimensional point cloud of the terrain profile has been measured by the surrounding monitoring sensor,
calculate an alternative route on which the vehicle body can travel without passing through the undetected area on a basis of positional relationship between the undetected area and the vehicle body,
update the scheduled route with the alternative route,
calculate disappearance time of the undetected area and passage time of the undetected area in the scheduled route,
not to calculate the alternative route in a case where the passage time is equal to or more than the disappearance time, and
calculate the alternative route in a case where the passage time is shorter than the disappearance time.

2. The autonomous travelling mine vehicle according to claim 1, wherein
the surrounding monitoring sensor is a ranging sensor that measures a distance to a terrain profile around the vehicle body.

3. The autonomous travelling mine vehicle according to claim 1, wherein
the travelling route setting device is configured to
store a point cloud map representing a terrain profile around the vehicle body, and
calculate, as the undetected area, an area that is unable to be collated with the point cloud map among the three-dimensional point cloud.

4. The autonomous travelling mine vehicle according to claim 1, wherein
the travelling route setting device is configured to
assign the three-dimensional point cloud to each cell of a grid map,
group adjacent cells to which the three-dimensional point cloud is assigned, and
calculate, as the undetected area, an area having a line connecting edge points of the groups with each other as a boundary.

5. The autonomous travelling mine vehicle according to claim 1, wherein
the travelling route setting device is configured
to calculate, as an optimum vehicle velocity, a travelling velocity of the vehicle body such that the passage time and the disappearance time are equal to each other,
to calculate, as a first travelling time, a travelling time to a predetermined destination in a case where the scheduled route is travelled on at the optimum vehicle velocity,
to calculate, as a second travelling time, a travelling time to the destination in a case where the alternative route is travelled on,
not to update the scheduled route with the alternative route in a case where the first travelling time is equal to or less than the second travelling time, and
to update the scheduled route with the alternative route in a case where the first travelling time is longer than the second travelling time, and
the vehicle controller is configured to control a vehicle velocity of the vehicle body to the optimum vehicle velocity in a case where the scheduled route is not updated with the alternative route by the travelling route setting device.

6. The autonomous travelling mine vehicle according to claim 5, wherein
the vehicle controller is configured to stop the vehicle body in a case where neither the alternative route nor the optimum vehicle velocity is calculated by the travelling route setting device.

* * * * *